United States Patent

[11] 3,536,011

[72] Inventors Laird D. Kinnaird and
James L. Casadevall, Orlando, Florida
[21] Appl. No. 693,406
[22] Filed Dec. 26, 1967
[45] Patented Oct. 27, 1970
[73] Assignee Martin Marietta Corporation
New York, New York
a corporation of Maryland

[54] SELF-SHARPENING, HIGH BALLISTIC FACTOR VEHICLE NOSE CAP
10 Claims, 4 Drawing Figs.

[52] U.S. Cl. ..................................... 102/105, 244/117.1
[51] Int. Cl. ..................................... F42b 11/00, F42b 13/00
[50] Field of Search ........................... 102/105; 23/209.1(F), 209.2; 117/46(CG), 226; 244/117.1

[56] References Cited
UNITED STATES PATENTS
3,095,162 6/1963 Keon ........................... 244/117.1
3,177,811 4/1965 Baylor et al. ................. 102/105

OTHER REFERENCES
AVIATION WEEK, July 25, 1960, Pages 26— 28 (YAFFEE)
AVIATION WEEK, Feb. 13, 1961 pages 67, 69— 72 (YAFFEE)
AVIATION WEEK AND SPACE TECHNOLOGY, pages 94–95 and 97 (WRIGHT)
PAULING, COLLEGE CHEMISTRY, 1955, pp 531 & 532

Primary Examiner—Samuel Feinberg
Assistant Examiner—James Fox
Attorneys—Julian C. Renfro and Gay Chin ABSTRACT: This invention relates to the construction of a nose cap for a flight vehicle, such as a high ballistic factor missile, that makes effective use of a central rod constructed of a bundle of segments of pyrolytic graphite that are tightly overwrapped to form the structural core of the nose cap. The orientation of each of the segments of the structural core is such that the heat generated from high-speed flight is pumped down the central rod to a metal substructure, rather than the outer surface of the nose cap being designed to attempt to prevent the inflow of heat. In this manner, the high strength at elevated temperatures of pyrolytic graphite is obtained, the resulting nose cap is self-sharpening, and the tendency of the pyrolytic graphite to delaminate into sheets is effectively prevented by the constructional techniques employed.

Patented Oct. 27, 1970

3,536,011

INVENTOR
LAIRD D. KINNAIRD
JAMES L. CASADEVALL
BY *Julian C. Renfro*
ATTORNEY

SELF-SHARPENING, HIGH BALLISTIC FACTOR VEHICLE NOSE CAP

This invention relates to a novel nose cap for flight vehicle, which is particularly suited for use as the leading portion of nose, wing, or the like of a very high-speed flight vehicle intended for atmospheric passage at speeds up to or exceeding orbital velocity, which nose cap differs from the prior art constructions by not striving to exclude the heat generated at such speeds.

The problems of extreme and destructive heating of maneuverable vehicles during their very rapid passage through the atmosphere have become crucial and heretofore have not been met satisfactorily. Aerodynamic heating becomes critical in extreme velocity, low altitude flight vehicles and is increasingly a limiting factor in the cases of interceptor vehicles, vehicles moving approximately at orbital velocity at the initiation of atmospheric entry, and lunar return vehicles. All these, especially at the leading areas of exposed surfaces, must withstand extreme temperatures, with the time period involved depending on the vehicle and mission.

Prior art ablation and heat-sink materials by no means present complete and satisfactory solutions to the heating problems of a maneuverable vehicle which travels through the atmosphere at speeds resulting in extreme heating rates and pressures. The principal difficulty in use of these materials centers about the prohibitively large shape changes that result in problems of changes in weight and balance and in the aerodynamic characteristics of the vehicle. Further, where very high heating rates and pressures are encountered, a material which would be efficient as an ablation material in certain entry vehicles may lose its protective efficiency in failing to vaporize because of excessive mechanical fracturing and spalling.

There is a distinct need, therefore, for other than conventional materials to be employed to form the leading edges, nose tips, etc. of high speed vehicles and which will successfully withstand temperatures up to and including the stagnation temperatures which occur in such locations.

One prior art teaching involved a nose cap utilizing a plurality of elongate refractory members, such as of ceramic, bundled in close relation, and disposed in a cavity formed in a refractory body, such as of graphite. Such a composite structure made use of the fact that graphite has moderate resistance to thermal shock, has high emissivity, and is of favorable strength-to-weight ratio, whereas the ceramic is a good heat insulator and has excellent resistance to erosion, thus overcoming to some extent the tendency of graphite to erode badly above 3,000°F., and the tendency of ceramics to be highly vulnerable to thermal shock. However, this construction was expensive, not usable at extremely high heating rates or pressures, and tended to become blunted and thus altering its aerodynamic characteristics radically.

Other prior art nose caps have involved utilizing carbon or graphite that is machined into an appropriate ogival configuration, whereas still others have been made of glass phenolic, asbestos or the like, with such materials being disposed in a shingle wrap about a conventional core. All of these have been unsatisfactory in varying degrees.

In accordance with the present invention, the unusual properties of pyrolytic graphite are effectively utilized so as to provide a nose cap that is in effect self-sharpening, thus assuring that a high ballistic factor reentry vehicle or the like can remain an effective, accurate weapon although exposed to extreme heating conditions.

This invention is at least partly based on the fact that pyrolytic graphite is anisotropic, that is, has the tendency to transfer heat in one direction more readily than in another, and this in addition to the increase in strength of this material until the sublimation temperature is reached has led us to design a nose cap utilizing a central rod of pyrolytic graphite, in which the heat generated by high speed friction with the air is in effect pumped along such rod, thus reducing the thermal gradients and the tendency of the graphite to spall. We have found this approach superior to the more conventional one, which of course involved the nose cap being designed so as to attempt to keep the interior structure cool. Because of the effective transfer of heat along the core, the central rod in accordance with our invention remains substantially intact, and therefore serves to help maintain the high ballistic factor of the weapon.

It should be noted that the tendency of pyrolytic graphite to delaminate into separate sheets of material is effectively prevented in accordance with this invention by cutting the pyrolytic graphite into elongated segments that are preferably of triangular cross section. These segments are then assembled together in a manner somewhat resembling the sections of an orange or the like, which segments are then tightly bound together with one or more overlaps of high temperature material which prestresses the pyrolytic graphite, thus forming a central rod of pyrolytic graphite that maintains its structural integrity even under the most severe heating conditions.

It is therefore a principal object of our invention to provide a nose cap that is relatively simple to construct, but which will withstand extremely high heating conditions for at least moderate lengths of time.

It is another object of our invention to provide a nose cap that is constructed to permit a controlled inflow of heat generated by high speed flight, rather than trying to exclude heat in the manner followed by conventional nose caps.

It is yet another object of this invention to provide a nose cap that is able because of its self sharpening characteristics to maintain desirable aerodynamic attributes under the adverse conditions accompanying hypersonic flight.

It is a further object of our invention to utilize a plurality of pyrolytic graphite segments that are bound together so as to effectively prevent the separation of this material into separate layers, as ordinary pyrolytic graphite is prone to do.

These and other objects, features and advantages of our invention will be more apparent upon a study of the appended FIGS. of drawings in which.

Figure 2:
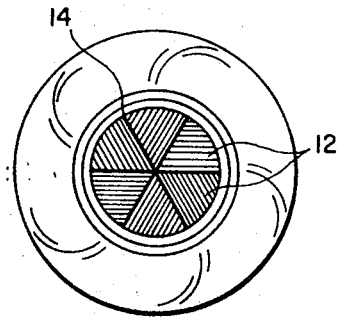
FIG. 2 is a cross-sectional view taken along the lines 2–2 in section 1 so as to reveal the direction of placement of the planes constituting the pyrolytic graphite.
Figure 3:
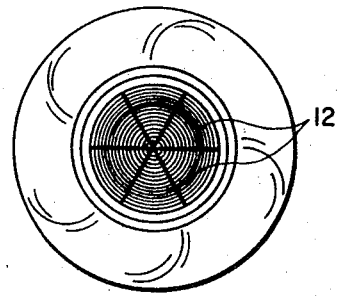
Figure 4:
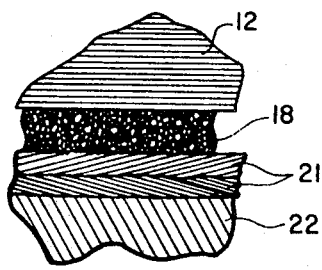

FIG. 3 is a view similar to that of FIG. 2, but showing an embodiment in which the various layers of pyrolytic graphite are arranged circumferentially rather than substantially radially as in FIG. 2; and FIG. 4 is a cross-sectional view to a somewhat larger scale so as to reveal the carbon or other refractory filament tension wrap disposed around the pyrolytic graphite rod as well as the succeeding layers of grafoil or other refractory insulation tape that serve as a heat insulation preventing a substantially high flow of heat from the center rod into the overwrap.

Figure 1:
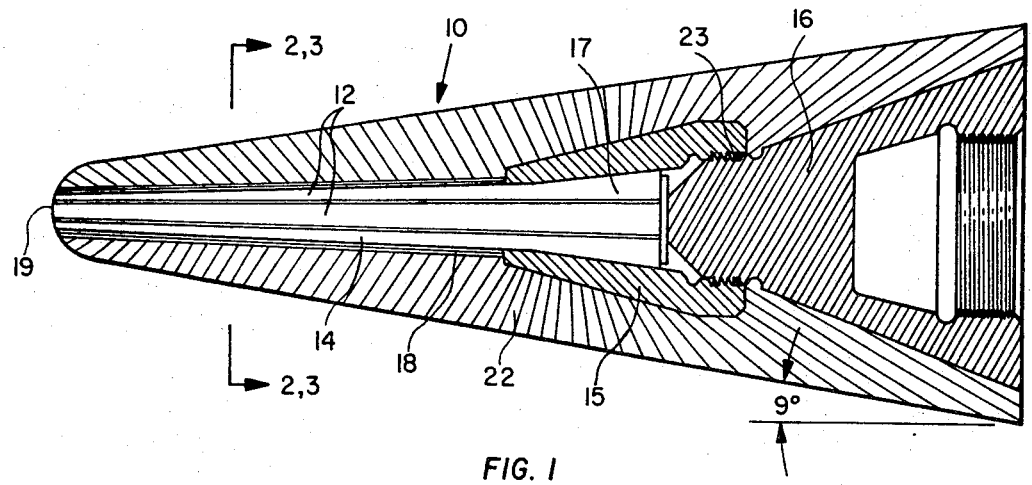
FIG. 1 is a cross-sectional view of an exemplary form of nose cap in accordance with this invention, illustrating the pyrolytic graphite segments overwrapped by a refractory filament tension wrap as well as spiral or circularly wrapped fiber reinforced plastic ablator, with the base portions of such segments contacting a tungsten member serving as a heat sink.

Reference may now be made to FIG. 1 wherein hose cap 10 is provided in accordance with this invention. As may be obvious, this nose cap may be secured in accordance with conventional techniques to the front section of a missile or other flight vehicle so as to protect the vehicle against the deleterious effects of aerodynamic heating that takes place at high Mach numbers.

Our nose cap principally utilizes a cluster of pyrolytic graphite segments 12 that together form a rod 14 disposed along the centerline of the nose cap, and held by a collet 15 or the like in direct contact in heat-sink member 16 such as of tungsten or the like. In this manner, heat entering the tip 19 can flow along the graphite segments and thence flow into heat-sink member 16.

As is known, pyrolytic graphite is a manmade product created by vapor deposition techniques These techniques dispose the graphite in the form of platelets having very distinct heat transfer properties, thus giving the product the appearance, in cross section, of that of cord wood. Pyrolytic graphite has the highly advantageous characteristic of not melting until extreme pressures and temperatures are reached, but rather it sublimes at temperatures in the vicinity of 6,000°F. This is of course to be contrasted with ordinary graphite, which is granular in nature and spalls when subjected to high thermal environments before the sublimation or melting temperatures are reached. However, the low laminar strength of pyrolytic graphite has in the past prevented the use of this product in instances where mechanical weakness could not be tolerated.

As will be noted from FIG. 1 as well as FIGS. 2 and 3, we shape the pyrolytic graphite into segments having, for example, triangular cross section with the layering of each segment being disposed in such a direction that heat can flow from the forwardmost end of each segment toward the rearmost end thereof without any substantial amount of heat flowing from one layer of any given segment into another. As will be apparent from FIGS. 2 and 3, the segments, upon being interfitted, form a generally cylindrical configuration, which segments may of course be turned in a lathe to assure the desired cross-sectional shape at various locations along the length of the rod so formed. However, we are not to be limited to the use of triangular cross-sectional segments, for a cluster of round, hexagonal, or other shaped segments could of course be employed within the spirit of our invention.

Exhaustive tests have shown that pyrolytic graphite has the lowest recession rate of all the graphites, but as mentioned earlier, it normally fails by delamination. Accordingly, we have invented a design that effectively prevents delamination, and for the first time makes it possible to evolve a structural core for a nose cap or the like that possesses the required mechanical strength at high temperatures. Although the pyrolytic graphite could be manufactured in any of a number of configurations, significantly, our rod segments are preferably made up from non critical plate stock, which can be readily purchased from any of a number of qualified vendors, and can be inspected in detail before being incorporated into the central rod.

The base portion 17 of the rod is preferably flared somewhat, so that the threaded collet 15, which has an interior portion possessing a complementary taper, can properly receive the base of the rod. The rearmost portion of the collet threadedly engages the forward portion of heat-sink 16, so upon the collet being tightened, the bases of the segments are forced into a tight fit with the forward tip of the member 16. The collet also serves to hold the segments together during any turning operation, and during the overwrapping of the segments that is utilized to bring about the formation of the rod as a functioning member. The collet 15 is preferably of aluminum, and heat-sink 16 of tungsten. O-ring 23, such as of Teflon, may be disposed behind the end of the threads of the heat-sink member, thus serving to prevent heated gases that might tend to flow down between or around the graphite segments during extreme heating conditions from reaching the base portions of the nose cap.

The tension overwrap, shown at 18 in FIGS. 1 and 4, serves to hold the several segments tightly together, thus maintaining a considerable force on each segment, tending to prevent the several layers constituting each segment from separating. We may utilize a carbon filament for tension overwrap 18, or other fibers such as boron nitride, graphite, or the like, having high temperature properties sufficient to resist separation of the segments under thermal conditions. This carbon roving overwrap may for example amount to thickness of say .010 inches, and resort may be had to FIG. 4 for a clear understanding of this construction. It should be noted that we prefer to apply a significant tension to the fiber or filament during the tension overwrap, thus creating a preload that would have to be overcome before any delamination could possibly occur.

Subsequent to tension wrapping, we wrap the item with grafoil tape or other like refractory insulator in order to provide an insulating layer between the high temperature center rod and outer wrap. Preferably, we apply the grafoil tape in two directions as shown at 21 in FIG. 4, with the heat transfer planes being maintained flat. This tape additionally serves to prevent the penetration of resin from the outer wrap into the filament windings 16, which might have the effect of causing a high-pressure buildup due to decomposition of the resin.

As illustrated in FIGS. 1 and 4, we then apply a carbon phenolic or similar outer wrap 22 to complete the desired aerodynamic shape of the nose cap. While we can accomplish this outer wrap in accordance with well-known shingle overwrap techniques, we prefer to use a unidirectional full end grain construction of carbon or similar fibers in which all fibers are disposed in an optimum placement. Quartz phenolic, silica phenolic, and graphite phenolic may also be considered as overwrap materials. In each instance, the shoulders of the nose cap ablate faster than the rod 14, thus aiding in keeping the nose cap sharp.

Upon completing the outer wrap the nose cap is then placed in a molding tool which applies heat and pressure sufficient to effect a complete cure. For example, the temperature may be 325°F., with a molding pressure of from 100 to 1,000 p.s.i. Typical molding time is approximately one hour per one-quarter" of molding thickness.

Upon removal from the mold such finishing operations as are necessary may be performed, such as for example trimming to length in a lathe, deflashing, or the like.

Returning to FIG. 1, it may be noted that the tungsten heat-sink member 16 may serve as a secondary nose cap, should violent rain erosion or blast loads occur sufficient to remove the forward portion of the nose cap, including the aluminum collet. Even then, the use of missile constructed in accordance with our invention remains reasonably sharp. It should be noted that the tungsten heat-sink member is usually only a fraction of the overall length of the missile nose cap inasmuch as too large a metallic heat-sink component unnecessarily increases the weight of the nose cap without enhancing the thermal properties of the nose cap.

Referring back to FIGS. 2 and 3 it will be noted that we have illustrated two different types of pyrolytic graphite segment arrays. Certain other arrays may be used as long as it is kept in mind that the flow of heat from the forward portions of the segments to the rear portion should not be inhibited by requiring the heat to pass in considerable quantities from one plane or layer to another.

Our nose cap may have a tip radius of one-half inch, a cone half angle of 9°, and the vehicle may have a ballistic factor of 2,000. However, we cite these as merely being exemplary, for obviously we are not to be limited to any of these values.

As an alternative to the construction described above, the rod 14, after being given the tension overwrap, can be arranged to receive a precured outer portion made by wrapping the outer heat shield portion on a properly sized and dimensioned mandrel, from which it may be removed after curing. Then, the outer portion can be assembled upon the rod, and held by adhesive means, for example. We prefer the use of a product known as HT 424, adhesive film or paste, which is manufactured by Bloomingdale Rubber Company of Havre de Grace, Md.

As should now be apparent, our invention principally involves the employment of a high temperature anisotropic material as the central core of a nose cap. Such materials principally involve the use of carbon when temperatures reaching several thousand degrees Fahrenheit are encountered. Various elements may be added to or combined with carbon in order to achieve the particular properties sought for a given application. For example, the high temperature anisotropic material can be boron pyrolytic graphite.

The center rod may also be constructed of other materials similar to pyrolytic graphite that exhibit the anisotropic properties of conduction and expansion required.

It is further to be noted that the restraining collet may also be constructed of other materials than aluminum, such as steel, titanium or the like.

We claim:

1. A nose cap forming a forward part of a flight vehicle having a contoured exterior surface comprising a center rod made up of a plurality of segments of refractory thermally anisotropic material bound together, said rod being disposed so that one end thereof encounters the stream of fluid through which said vehicle moves, and thus being subjected to high heating conditions when hypersonic velocities are reached.

2. A nose cap forming a forward part of a flight vehicle having a contoured exterior surface comprising a center rod made up of a plurality of segments of pyrolytic graphite bound together, said rod of pyrolytic graphite being disposed so that one end thereof encounters the stream of fluid through which said vehicle moves, and thus being subjected to high heating conditions when hypersonic velocities are reached.

3. A nosepiece forming a forward part of a flight vehicle having a contoured exterior surface comprising a rod built up of a plurality of segments of refractory anisotropic material overwound with refractory material so as to prevent the separation of the segments from each other, or the possible delamination of such anisotropic material into separate sheets, with the orientation of the sheets of anisotropic material in the individual segments being such that heat is readily conducted from the forwardmost tip of the rod to the rearmost portion thereof.

4. A nosepiece forming a forward part of a flight vehicle having a contoured exterior surface comprising a rod of pyrolytic graphite composed of a plurality of segments of pyrolytic graphite overwound with refractory material so as to prevent the separation of the segments or the delamination of pyrolytic graphite into separate sheets, with the orientation of the sheets of pyrolytic graphite in the individual segments being such that heat is readily conducted from the forwardmost tip of the rod to the rearmost portion thereof.

5. A nosepiece forming a forward part of a flight vehicle having a contoured exterior surface comprising a rod of pyrolytic graphite composed of a plurality of segments of pyrolytic graphite overwound with refractory material so as to prevent the separation of the segments or the delamination of pyrolytic graphite into separate sheets, with the orientation of the sheets of pyrolytic graphite in the individual segments being such that heat is readily conducted from the forwardmost tip of the rod to the rearmost portion thereof, and heat-sink means contacted by the rear portion of the rod so that the heat conducted by said rod can be absorbed in said heat-sink means.

6. The nose cap as defined in claim 5 in which refractory fibers are employed for initially binding said pyrolytic graphite segments together, with the desired external configuration of the vehicle being rounded out by fiber reinforced ablative material disposed thereon.

7. The nose cap as defined in claim 5 at least in which a portion of said heat-sink means is constructed of refractory metal.

8. The nose cap as defined in claim 5 in which the orientation of the sheets of the pyrolytic graphite constituting each segment is such that the segments together in effect form a number of concentric circles.

9. The nose cap as defined in claim 5 in which the various layers of pyrolytic graphite constituting the rod in effect extend radially.

10. The nose cap as defined in claim 5 in which substantial tension is involved in holding the pyrolytic graphite segments together, thus amounting to a prestressing that must be overcome before any delamination of the segments could occur.